US012101631B1

(12) United States Patent
Pala et al.

(10) Patent No.: US 12,101,631 B1
(45) Date of Patent: Sep. 24, 2024

(54) SYSTEMS AND METHODS FOR NETWORK DEVICE ADVANCED PRIVACY

(71) Applicant: CABLE TELEVISION LABORATORIES, INC., Louisville, CO (US)

(72) Inventors: Massimiliano Pala, Denver, CO (US); Tao Wan, Ottawa (CA); Simon Krauss, Denver, CO (US); Chad Riland, Fort Collins, CO (US); Martha Lurie Lyons, Sunnyvale, CA (US)

(73) Assignee: Cable Television Laboratories, Inc., Louisville, CO (US)

( * ) Notice: Subject to any disclaimer, the term of this patent is extended or adjusted under 35 U.S.C. 154(b) by 476 days.

(21) Appl. No.: 17/240,511

(22) Filed: Apr. 26, 2021

Related U.S. Application Data

(60) Provisional application No. 63/015,303, filed on Apr. 24, 2020.

(51) Int. Cl.
*H04W 12/08* (2021.01)
*H04L 9/40* (2022.01)
*G16Y 20/00* (2020.01)

(52) U.S. Cl.
CPC ......... *H04W 12/08* (2013.01); *H04L 63/0281* (2013.01); *G16Y 20/00* (2020.01)

(58) Field of Classification Search
CPC .......................... H04L 63/0281; G16Y 20/00
See application file for complete search history.

(56) References Cited

U.S. PATENT DOCUMENTS

| | | | | |
|---|---|---|---|---|
| 8,644,457 B1 * | 2/2014 | Vasquez | ............... | H04M 3/4217 379/266.1 |
| 9,179,105 B1 * | 11/2015 | Zeira | ....................... | H04N 7/183 |
| 10,826,918 B1 * | 11/2020 | Rasovic | ................ | H04L 67/125 |
| 11,256,828 B1 * | 2/2022 | Machado | ............... | H04W 12/02 |
| 2018/0288007 A1 * | 10/2018 | Poornachandran | ......................... | H04L 63/0421 |
| 2021/0004200 A1 * | 1/2021 | Swaminathan | .... | H04N 21/4627 |

FOREIGN PATENT DOCUMENTS

WO    WO-2010028071 A1 *    3/2010    ............. G06Q 30/06

* cited by examiner

*Primary Examiner* — Benjamin E Lanier
(74) *Attorney, Agent, or Firm* — Armstrong Teasdale LLP

(57) ABSTRACT

A privacy proxy device for maintaining privacy on a communication network is provided. The privacy proxy device includes a transceiver, a processor, and a memory. The transceiver communicates with at least one user device and at least one device capable of recording over a communication medium of the communication network. The memory store computer-executable instructions, which, when executed by the processor, cause the privacy proxy device to store a plurality of privacy settings including one or more recording settings. The instructions further cause the privacy proxy device to receive a request to record from a recording device of the at least one device capable of recording. The instructions also cause the privacy proxy device to compare the request to record to the plurality of privacy settings. In addition, the instructions cause the privacy proxy device to generate and transmit a response to the request to record based on the comparison.

20 Claims, 9 Drawing Sheets

SYSTEMS AND METHODS FOR NETWORK DEVICE ADVANCED PRIVACY

CROSS REFERENCE TO RELATED APPLICATIONS

This application claims the benefit of and priority to U.S. Provisional Application No. 63/015,303, filed Apr. 24, 2020, entitled "MAX PRIVACY," which is hereby incorporated by reference in its entirety.

BACKGROUND

The field of the invention relates generally to advanced privacy settings, and more specifically, to systems and methods for real-time privacy setting viewing and adjustments for devices connected to a network.

Internet of Things (IOT) devices typically continuously collect data that can be sensitive. Individual IoT users, however, generally lack the knowledge of what is collected and how what is collected is used. Furthermore, individual IoT users usually lack control over the collection and use of the data collected. Without knowledge and control of these pervasive and high-volume devices, there occurs an over-collection of private data that could be harmful to society, and in particular with respect to people feeling they are being watched. Having proper knowledge and controls in place though, would increase consumer trust in and beneficial use of IoT devices. Conventional IoT systems primarily offer control only over the allowed destination IP address and domain IoT device communications. However, many of even these conventional systems do not offer the fine granularity control needed for privacy considerations. Accordingly, there is a desire in the industry to provide systems and methods enabling proper knowledge and controls to individual IoT users.

BRIEF DESCRIPTION

In an embodiment, a privacy proxy device is provided for maintaining privacy on a communication network. The device includes a transceiver, a processor, and a memory. The transceiver is configured for operable communication with at least one user device and at least one device capable of recording over a communication medium of the communication network. The memory is configured to store computer-executable instructions, which, when executed by the processor, cause the privacy proxy device to store a plurality of privacy settings including one or more recording settings. The executed instructions further cause the privacy proxy device to receive a request to record from a recording device of the at least one device capable of recording. The executed instruction also cause the privacy proxy device to compare the request to record to the plurality of privacy settings. In addition, the executed instructions cause the privacy proxy device to generate and transmit a response to the request to record based on the comparison.

In an embodiment, a privacy proxy device is provided for maintaining privacy on a communication network. The device includes a transceiver, a processor, and a memory. The transceiver is configured for operable communication with at least one user device and at least one device capable of recording over a communication medium of the communication network. The memory is configured to store computer-executable instructions, which, when executed by the processor, cause the privacy proxy device to store a plurality of privacy settings including one or more recording settings. The executed instructions further cause the privacy proxy device to receive a first message from a first device capable of recording, wherein the message is routed to a destination outside of the communication network. The executed instructions also cause the privacy proxy device to analyze the first message to detect for privacy violations based on the plurality of privacy settings. If no privacy violations are detected, the executed instructions cause the privacy proxy device to transmit the first message to the gateway to be routed to the destination.

BRIEF DESCRIPTION OF THE DRAWINGS

These and other features, aspects, and advantages of the present disclosure will become better understood when the following detailed description is read with reference to the following accompanying drawings, in which like characters represent like parts throughout the drawings.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events may be considered to occur substantially instantaneously.

The present embodiments relate generally to advanced privacy settings, and more specifically, to systems and methods for real-time privacy setting viewing and adjustments for devices connected to a network. For ease of explanation, the following description may generically refer to these several innovative embodiments as "the advanced privacy system." The advanced privacy system herein enables the user, consumer, and/or customer to control and monitor data collected by a local network regarding the customer devices. In particular, the present embodiments may include one or more of an entity that collects data (e.g., video, audio, etc.), such as an Internet of Things (IOT) device, a gateway and/or controller, and a set of network messages.

In the present advanced privacy system, entities use a Data Privacy Collection Management Protocol (i.e., via broadcast messages) to announce, discover, and control the type of data collection occurring in the local network. For example, the data collector/IoT device announces the type of data and the purpose of the collection by issuing a "collection start" message when the entity starts the collection and/or when a "collection discovery" broadcast message is received. Additionally, a device may, for example use a "collection suspend" broadcast message to "ask" that collection of data (or a specific type) is suspended for a certain amount of time (e.g., the phone can ask that no audio capture is performed by other devices while the call is on).

When devices support a Privacy Proxy Protocol, more options are available to the user and the network operator. In particular, the device may enable, via connection to the privacy proxy: (i) monitoring and intercepting the IoT for sensitive data transmission; (ii) classification and labeling of data being transmitted; (iii) user control over the data being transmitted; (iv) sharing communication keys for DPI; (v) providing periodic (e.g., monthly) reports of data collection; (vi) multiple system operators (MSOs) to collect aggregate data; and (vii) users to require multi-factor authentication to force the re-enroll of devices after a specific period.

According to the present techniques, beneficial data use is enabled through the MSO being able to provide, with customer approval, aggregate data information. Customers may also provide their own unique data for beneficial purposes.

In exemplary embodiments, two implementation levels are provided for privacy protection systems on networks. In some embodiments, the first level includes multiple devices on a network. In this level, the devices include IoT devices or other devices that may record and report information, such as, but not limited to, audio, video, behavior information, personal information, and other data. The devices on the network are configured to broadcast a message when the corresponding device is recording. For example, when an IP camera is recording video, the IP camera broadcasts a message over the network that it is currently recording video.

In another example, a smart doorbell may record video when it detects motion, but only record audio when the button is pressed, or the user activates that functionality. The smart doorbell would then broadcast a message that it was recording video when motion is detected. When the smart doorbell was recording both audio and video, the smart doorbell's broadcast message would indicate that both were being recorded. A user with a user computer device would then be able to connect to the network and determine if any devices are recording, which devices are recording, and what those devices are recording. In some further embodiments, the user computer device may be able to transmit a message to one or more recording devices to ask those devices to stop. In other embodiments, the user computer device can only ask the recording devices to stop if the user computer device has administration privileges, such as the owner of the network.

In an enhancement on this first level, a privacy proxy device may be added to the network. The privacy proxy device stores the user privacy settings of which types of recording may be performed and when. The privacy proxy device may receive updates to the user privacy settings from an authorized user computer device. In this enhancement, instead of broadcasting messages, the devices on the network unicast their recording messages to the privacy proxy device. A user computer device may connect to the privacy proxy device to determine which devices are currently recording. The user computer device may also ask the privacy proxy device to stop recording and the privacy proxy device will transmit a message to the devices that are recording requesting that they cease recording. In some embodiments, the request for stopping recording may be associated with a different event occurring on the network. For example, if the user computer device is a smartphone, and the user receives or makes a phone call, the user computer device may automatically instruct the privacy proxy to stop recordings for the duration of the phone call.

In another or supplemental embodiment, the second level of privacy protection conFIG.s the privacy proxy device to monitor the traffic of the devices on the network, which may be in addition to the functionality described above. In this embodiment, messages from the devices on the network are reviewed and analyzed by the privacy proxy device. The privacy proxy device includes privacy settings, including recording settings by the user. The privacy proxy device analyzes the message traffic, determines if each device is transmitting, and may then request that the device stop recording based on the privacy settings. In some embodiments, the privacy proxy device may prevent traffic of a particular recording device from leaving the network, especially in the case where the device ignores a stop recording instruction.

In an exemplary embodiment, the privacy proxy device is disposed between the devices and the gateway, or may be a part of the gateway. In this configuration, the privacy proxy device may receive all messages from devices leaving the network. In some embodiments, the privacy proxy device copies and transmits device messages to a privacy proxy analysis unit outside of the network. This privacy proxy analysis unit may then analyze the messages to determine what each device is transmitting outside of the network, and then report to the privacy proxy device, which in turn reports to the user. The privacy proxy analysis unit and/or the privacy proxy device may then analyze the message traffic to determine patterns, and thus be able to detect when a device is transmitting even if the device fails to report that it is transmitting.

Figure 1:
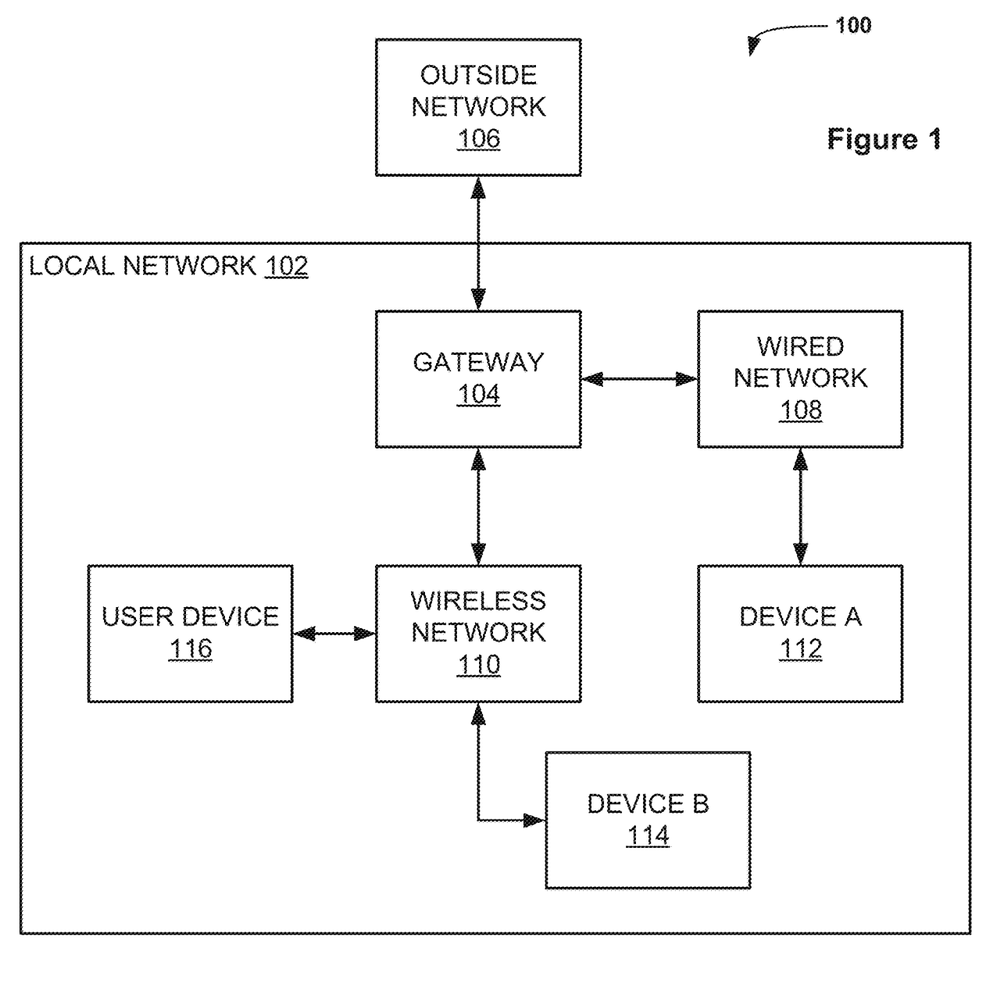
FIG. 1 illustrates a first computer network configured for a first level of privacy protection in accordance with at least one embodiment.

FIG. 1 illustrates a first computer network 100 configured for a first level of privacy protection in accordance with at least one embodiment. In an exemplary embodiment, first computer network 100 is a local network 102. In this example, local network 102 is depicted, by way of example and not in a limiting sense, a local area network (LAN) and includes a gateway 104 with access to one or more outside networks 106. Outside networks 106 may include, but are not limited to, the Internet, another LAN, and a wide area network (WAN). Local network 102 includes at least one of a wired network 108 and/or a wireless network 110. Wired network 108 or wireless network 110 connects device A 112 and device B 114 to local network 102. Devices A/112 and B/114 may include, but are not limited to, IoT devices, such as IP cameras, smart home devices, and/or other devices capable of recording one or more of audio, video, and/or data.

Local network 102 also includes one or more user devices 116. User devices 116 may include smart phones, tablets, laptop computers, and/or any other computer devices capable of interacting with local network 102 as described herein. User devices 116 may connect to wireless network 110 and/or wired network 108, based on the user device 116 itself. Some user devices 116 may be associated with local network 102 and are connected to local network 102 on a regular basis. Other user devices 116 may connect to local network 102 occasionally, such as a user device 116 belonging to a guest on local network 102.

In an exemplary embodiment, each device A 112 and B 114 is capable of recording. Further to this example, each device A 112 and B 114 is programmed to broadcast messages when device A 112 and/or B 114 is recoding. In some embodiments, the broadcast messages are User Datagram Protocol (UDP) messages transmitted to every computer device, network device, and/or other device on local network 102. For example, if device A 112 was recording, then device A 112 would broadcast a message over local network 102, which would be received by gateway 104, device B 114, and user device 116. In this exemplary embodiment, the message would be a single packet including the originating device and what type of recording was occurring, and may further include a Boolean field for each type of recording that device A 112 may be performing that would be marked "yes" if device A 112 was performing that type of recording. The messages may be broadcast over the network on a periodic basis, such that other devices are regularly up to date about the recording status of each device A 112 and B 114, but without clogging traffic of local network 102.

In exemplary operation, when a user device 116 connects to local network 102, the user device 116 receives broadcast messages to inform of the current recording status of devices A 112 and B 114 on local network 102. For example, local network 102 is a network for a home. In this example, a guest user may connect to local network 102 with their user device 116 and determine whether or not devices on the network are recording, and what type of recording they are performing. In another example, local network 102 is a network for a business or office. In this example, several workers may be having a private meeting, including a discussion of sensitive matters, and may then check the recording status of devices A 112 and B 114 on local network 102 to detect if either device is recording. The workers may, for example, only be concerned about devices A 112 and B 114 if such devices are physically located within the meeting room in which the discussion occurs.

In an exemplary embodiment, the user device 116 transmits a stop recording request to one or more of devices A 112 and B 114 to stop recording. The corresponding device A 112 and B 114 may stop recording based on the configuration of that device. For example, some devices may only access stop recording requests from individuals with specific credentials. Additionally, some devices might not be configured to handle stop recording requests.

Figure 2:
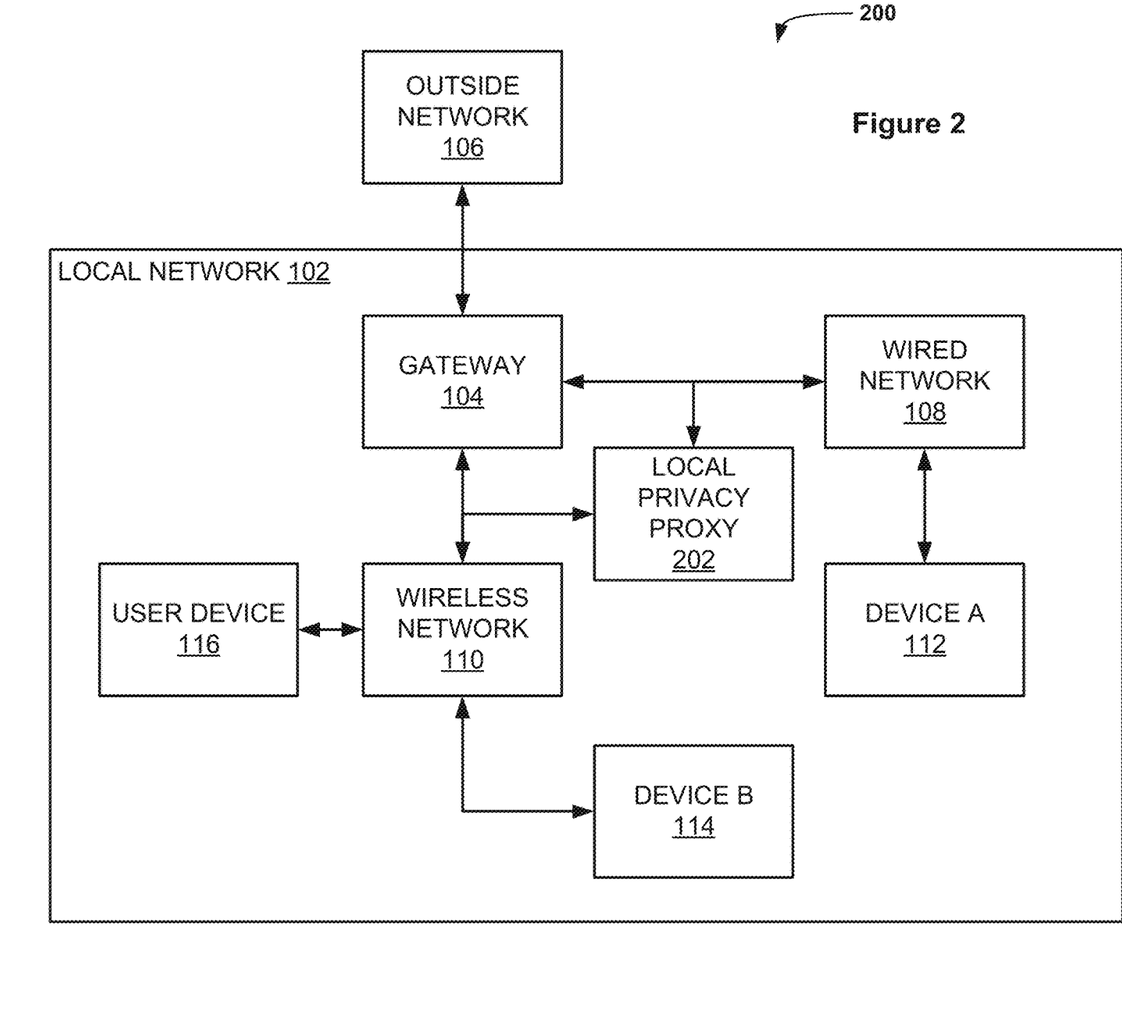
FIG. 2 illustrates a second computer network configured for an enhanced version of the first level of privacy protection shown in FIG. 1.

FIG. 2 illustrates a second computer network 200 configured for an enhanced version of the first level of privacy protection shown in FIG. 1. Network 200 is enhanced with a local privacy proxy 202. In an exemplary embodiment, local privacy proxy 202 acts as a centralized controller for the privacy settings of local network 102. In this embodiment, devices A 112 and B 114 communicate with local privacy proxy 202 to report their current recording status. Rather than broadcasting messages across local network 102, devices A 112 and B 114 unicast their messages, with their corresponding recording statuses, directly to local privacy proxy 202. Local privacy proxy 202 stores the current recording status of devices A 112 and B 114. When a user device 116 connects to the network, local privacy proxy 202 reports the recording statuses of devices A 112 and B 114. In some embodiments, the user device 116 requests the current recording status from local privacy proxy 202, such as through an application on user device 116.

In an embodiment, local privacy proxy 202 stores one or more privacy settings. These privacy settings may include whether or not recording is currently allowed on local network 102. The privacy settings may be updated by the user through the user device 116 communicating with local privacy proxy 202. For example, the privacy settings may include when audio and/or video may be recorded by devices A 112 and B 114 on local network 102, and which may be set on a time-based scheduled or based on other events, such as the user receiving or placing a phone call. Furthermore, while local privacy proxy 202 may transmit the current recording status to user devices 116 on local network 102, in some embodiments, local privacy proxy 202 only accepts updates to the privacy settings from user devices 116 with specific credentials.

In such cases, local privacy proxy 202 may have a specified amount of control over devices A 112 and B 114. For example, devices A 112 and B 114 transmit requests to record to local privacy proxy 202. Local privacy proxy 202 then either approves or denies the requests to record based on the current privacy settings. Furthermore, local privacy proxy 202 also transmits requests to stop recording when the current privacy settings changes. For example, the user device 116 may change a privacy setting, such as instructing local privacy proxy 202 to stop all video recording. Local privacy proxy 202 may then determine which of devices A 112 and B 114 are recording video, and instruct that device(s) to stop recording video.

Figure 3:
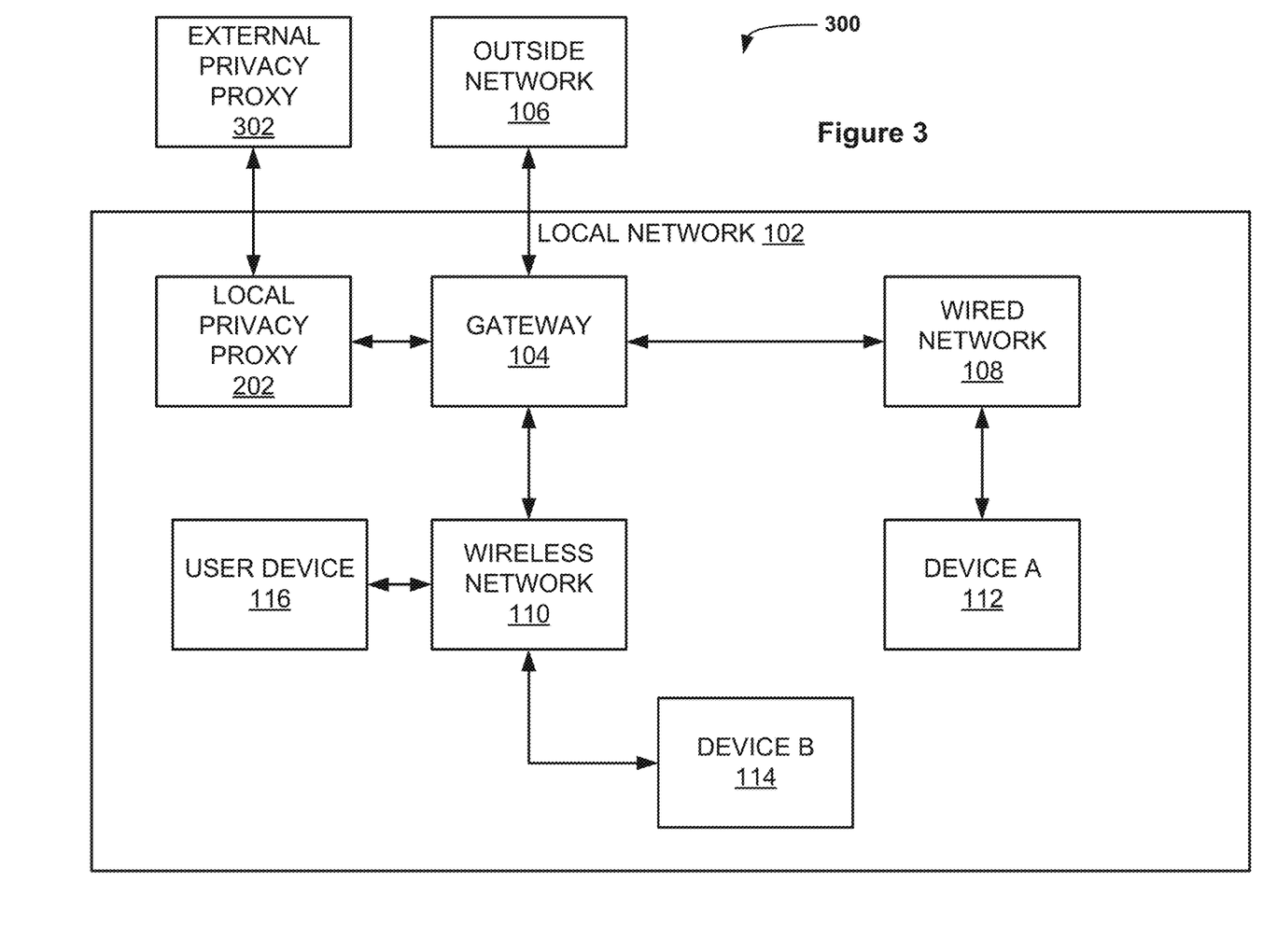
FIG. 3 illustrates a third computer network configured for a second level of privacy protection in accordance with at least one embodiment.

FIG. 3 illustrates a third computer network 300 configured for a second level of privacy protection in accordance with at least one embodiment. In the second level of privacy protection, local privacy proxy 202 acts as an intermediary device between gateway 104 and devices A 112 and B 114. In some embodiments, local privacy proxy 202 is a part of gateway 104. In other embodiments, local privacy proxy 202 is separate from gateway 104. In some embodiments, local privacy proxy 202 uses the HTTP and HTTPS protocols to enable review of packets from most current applications.

In exemplary operation, local privacy proxy 202 receives and analyzes the messages, intended for outside network 106, transmitted from devices A 112 and B 114. Local privacy proxy 202 reviews the messages to determine what information devices A 112 and B 114 are transmitting to outside network 106. For example, local privacy proxy 202 may determine that device A 112 is currently recording video and transmitting that video to one or more locations outside of local network 102. Local privacy proxy 202 then determines that one of the locations is a storage location associated with device A 112. In one example, this different location could be a current location of a user device 116, particularly in the case where the user device 116 is currently on another network, such as when a homeowner is remotely connecting to and receiving video from an IP camera within the homeowner's home local network 102. In another example, device A 112 could be a smart doorbell, with the user able to answer the doorbell from a location remote from the user's home network, and while the doorbell is recording both audio and video, and transmitting these recordings to the user device 116 at the remote location.

In some embodiments, local privacy proxy 202 is programmed to analyze the messages for private user information, such as personally identifiable information (PII). In these embodiments, local privacy proxy 202 scans the payload of each message from each of devices A 112 and B 114 for PII associated with one or more users of local network 102. Examples of PII include, but are not limited to, payment card numbers, social security numbers, phone numbers, address information, bank account numbers, and/ or any other PII for which local privacy proxy 202 is configured to scan. In some embodiments, local privacy proxy 202 modifies the messages to remove the PII. For example, local privacy proxy 202 could write over a payment card number with all zeros before transmitting the modified packet.

In some embodiments, local privacy proxy 202 determines when devices A 112 and B 114 are transmitting audio and/or video. In such instances, local privacy proxy 202 may use machine learning to recognize patterns of messages that indicate when a device A 112 or B 114 is recording. If local privacy proxy 202 transmits a request to stop recording, and which is then not acted upon by the device in question, then local privacy proxy 202 intercepts the messages from the device. In some cases, local privacy proxy 202 may then remove the payloads from the messages before transmitting the messages to gateway 104. In other embodiments, local privacy proxy 202 drops the messages from the corresponding device until recording is allowed.

In an embodiment, local privacy proxy 202 receives the messages from devices A 112 and B 114 and transmits those messages to an external privacy proxy 302 for analysis. In this example, local privacy proxy 202 may not be configured to handle the analysis of the messages, and thus uses external privacy proxy 302 to analyze the messages. In some cases, external privacy proxy 302 does not analyze the messages for immediate action in real time, but instead analyzes the messages and provides reports to local privacy proxy 202. For example, external privacy proxy 302 determines that one of the devices is still transmitting and recording after it was requested to stop. In another example, external privacy proxy 302 determines that one of the devices was transmitting PII. In both of these embodiments, external privacy proxy 302 reports to local privacy proxy 202, which then reports to the user via the user device 116. In these embodiments, the user can then determine what action to take.

Figure 4:
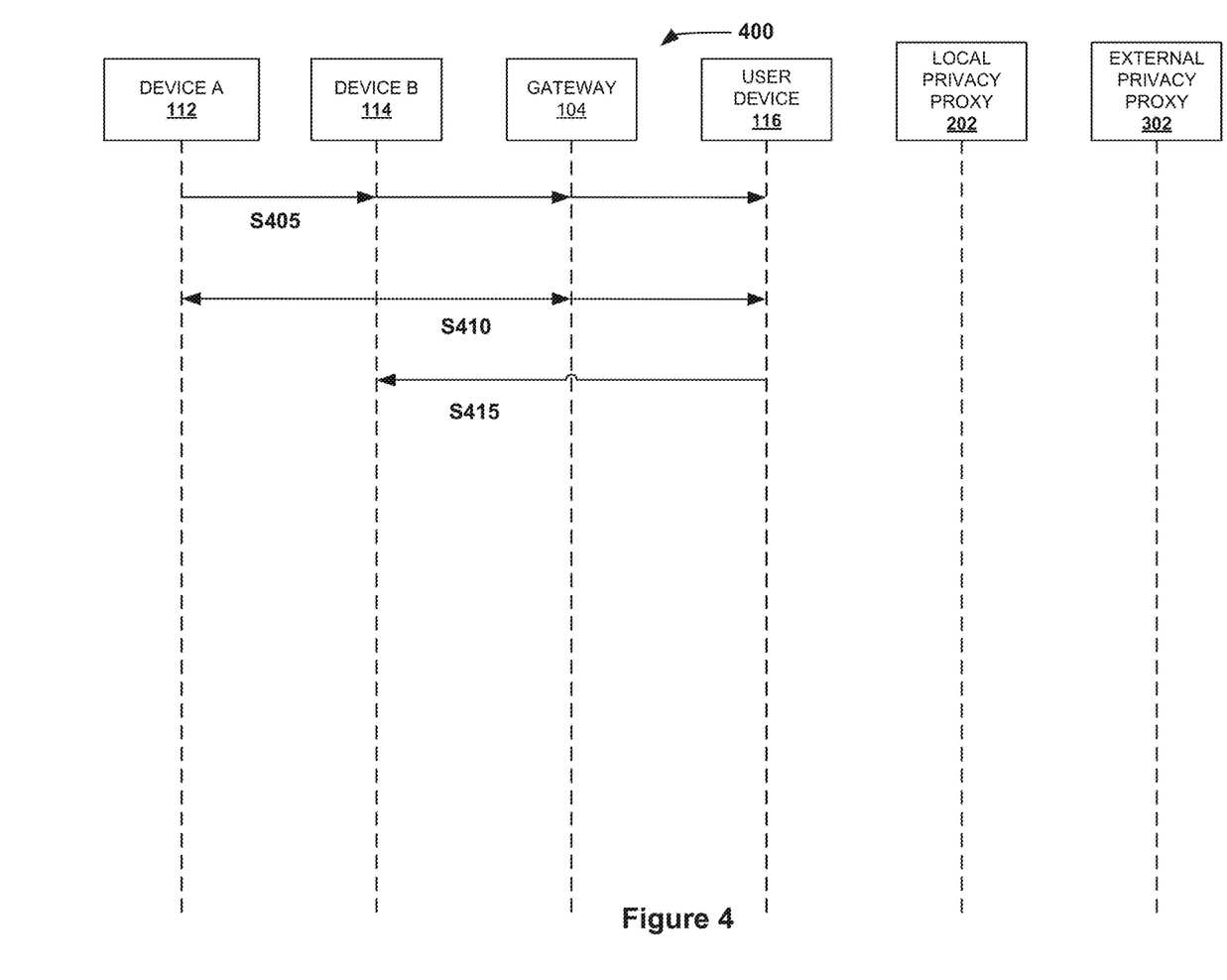
FIG. 4 illustrates a timing diagram of a process for reporting current privacy conditions using the first computer network shown in FIG. 1.

FIG. 4 illustrates a timing diagram of a process 400 for reporting current privacy conditions using first computer network 100 (shown in FIG. 1). In the exemplary illustration of process 400 depicted in FIG. 4, device A 112 is shown to be capable of recording audio, and device B 114 is capable of recording audio and video.

In exemplary operation, process 400 begins at step S405, in which device A 112 is currently recording audio and is broadcasting messages indicating that device A 112 is currently recording audio. These messages are transmitted to device B 114, gateway 104, and some or all of the user devices 116 on local network 102 (shown in FIG. 1) of first computer network 100. In step S410, device B 114 is recording audio and video and is broadcasting messages indicating that device B 114 is currently recording audio and video. These messages are transmitted to device A 112, gateway 104, and relevant user devices 116 on local network 102 of first computer network 100.

In step S415, the user device 116 transmits a request to device B 114 to stop recording video. Depending the particular configuration of device B 114, device B 114 will then (i) stop recording video, (ii) stop recording altogether, and/or (iii) ignore the request.

Figure 5:
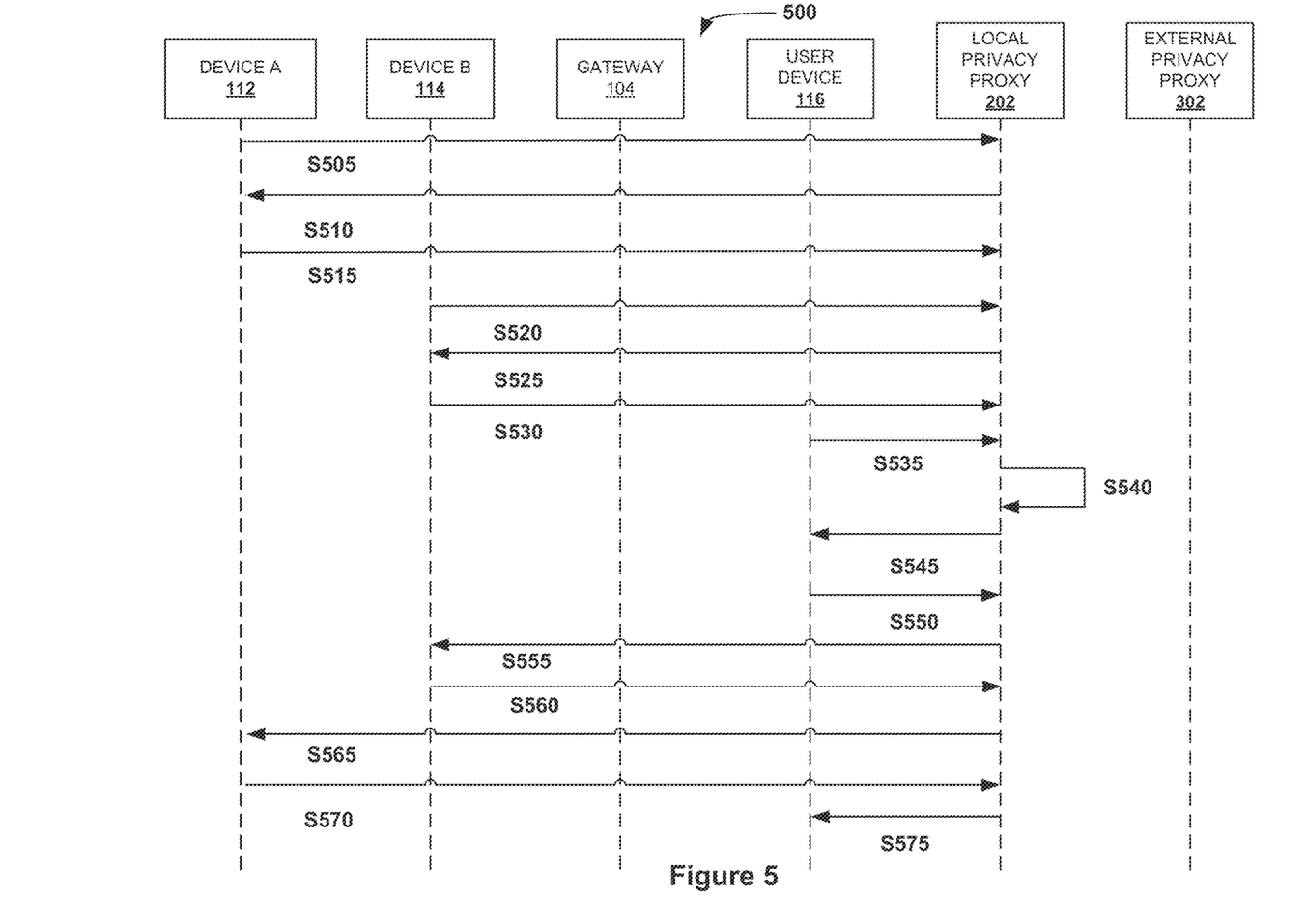
FIG. 5 illustrates a timing diagram of a process for controlling privacy conditions on the second computer network shown in FIG. 2.

FIG. 5 illustrates a timing diagram of a process 500 for controlling privacy conditions on second computer network 200 (shown in FIG. 2). In the exemplary illustration of process 500 depicted in FIG. 5, similar to process 400, FIG. 4, device A 112 is again considered capable of recording audio, and device B 114 is capable of recording audio and video.

In exemplary operation of process 500, local privacy proxy 202 stores the current privacy settings for local network 102 (shown in FIG. 2) of second computer network 200. In step S505, device A 112 transmits a request to record audio to local privacy proxy 202. Local privacy proxy 202 reviews the current privacy setting to determine if recording of audio is allowed. In step S510, local privacy proxy 202 transmits a response to device A 112. If audio recording is allowed, then local privacy proxy 202 transmits a positive response and device A 112 begins recording audio. In step S515, device A 112 begins transmitting recording status messages to local privacy proxy 202 indicating that device A 112 is currently recording audio. In an exemplary embodiment of step S515, device A 112 continues to transmit recording status messages for as long as device A 112 is recording audio. In some embodiments, local privacy proxy 202 transmits acknowledgement or confirmation messages in response to the recording status messages.

In step S520, device B 114 transmits a request to record audio and video to local privacy proxy 202. Local privacy proxy 202 reviews the current privacy setting to determine if recording of audio and/or video is allowed. In step S525, local privacy proxy 202 transmits a response to device B 114. In an exemplary embodiment of step S525, in the case where audio and video recording is allowed, the transmitted response from local privacy proxy 202 is a fully affirmative response, and device B 114 may then begin recording audio and video. Alternatively, in the case where only audio recording is allowed, then the response from local privacy proxy 202 indicates that device B 114 may begin recording audio, but not video.

In step S530, device B 114 begins transmitting recording status messages to local privacy proxy 202 indicating that device B 114 is currently recording audio. In an exemplary embodiment of step S530, device B 114 continues to transmit these messages for as long as device B 114 is recording audio. In some embodiments of step S530, local privacy proxy 202 transmits acknowledgement or confirmation messages in response to the recording status messages. In other embodiments of step S530, device B 114 does not begin recording. In the case where device B 114 is allowed to record audio and video, device B 114 may also be configured to, in step S530, further transmit messages to local privacy proxy 202 indicating that device B 114 is recording both audio and video.

In step S535, a user device 116 transmits a recording status request to local privacy proxy 202. In step S540, local privacy proxy 202 determines which of devices A 112 and B 114 are currently recording. In an exemplary embodiment of step S540, the determination is based on which devices are still transmitting recording status messages to local privacy proxy 202. In step S545, local privacy proxy 202 transmits the current recording status to the user device 116.

In some further embodiments, the user device 116 may request a change to the current privacy settings. For example, in step S550, the user device 116 requests that all recording stops. In an exemplary embodiment of step S550, local privacy proxy 202 determines which devices are currently recording, and then transmits stop recording requests to those devices. In some embodiments of step S550, local privacy proxy 202 validates the credentials of the user associated with the user device 116 before approving the change to the current privacy settings.

In step S555, local privacy proxy 202 transmits a stop recording request to device B 114. In step S560, device B 114 transmits a response to this stop recording request. In an exemplary embodiment of step S560, in the case where device B 114 stops recording, device B 114 transmits a confirmation thereof. Alternatively, device B 114 may not stop recording, for example, in the case where device B 114 is configured to continue recording, or in the case where device B 114 is not configured to respond to a stop recording request. In step S565, local privacy proxy 202 transmits a stop recording request to device A 112, and in step S570, device A 112 transmits a response thereto. In an exemplary embodiment of step S570, in the case where device A 112 stops recording, device A 112 transmits a confirmation thereof. Alternatively, device A 112 may not stop recording, for example, in the case where device A 112 is configured to continue recording, or in the case where device A 112 is not configured to respond to a stop recording request. In an exemplary embodiment, the messages of steps S555 and S565 are transmitted from local privacy proxy 202 simultaneously to all transmitting devices.

In further exemplary operation of process 500, local privacy proxy 202 receives confirmations from all recording devices indicating that such devices have stopped recording. In such instances, in step S575, local privacy proxy 202 transmits a confirmation to the user device 116 that recording has stopped. In some instances, such as in the case where any particular device does not stop recording, then local privacy proxy 202 may be further configured to report this event to the user device 116.

Figure 6:
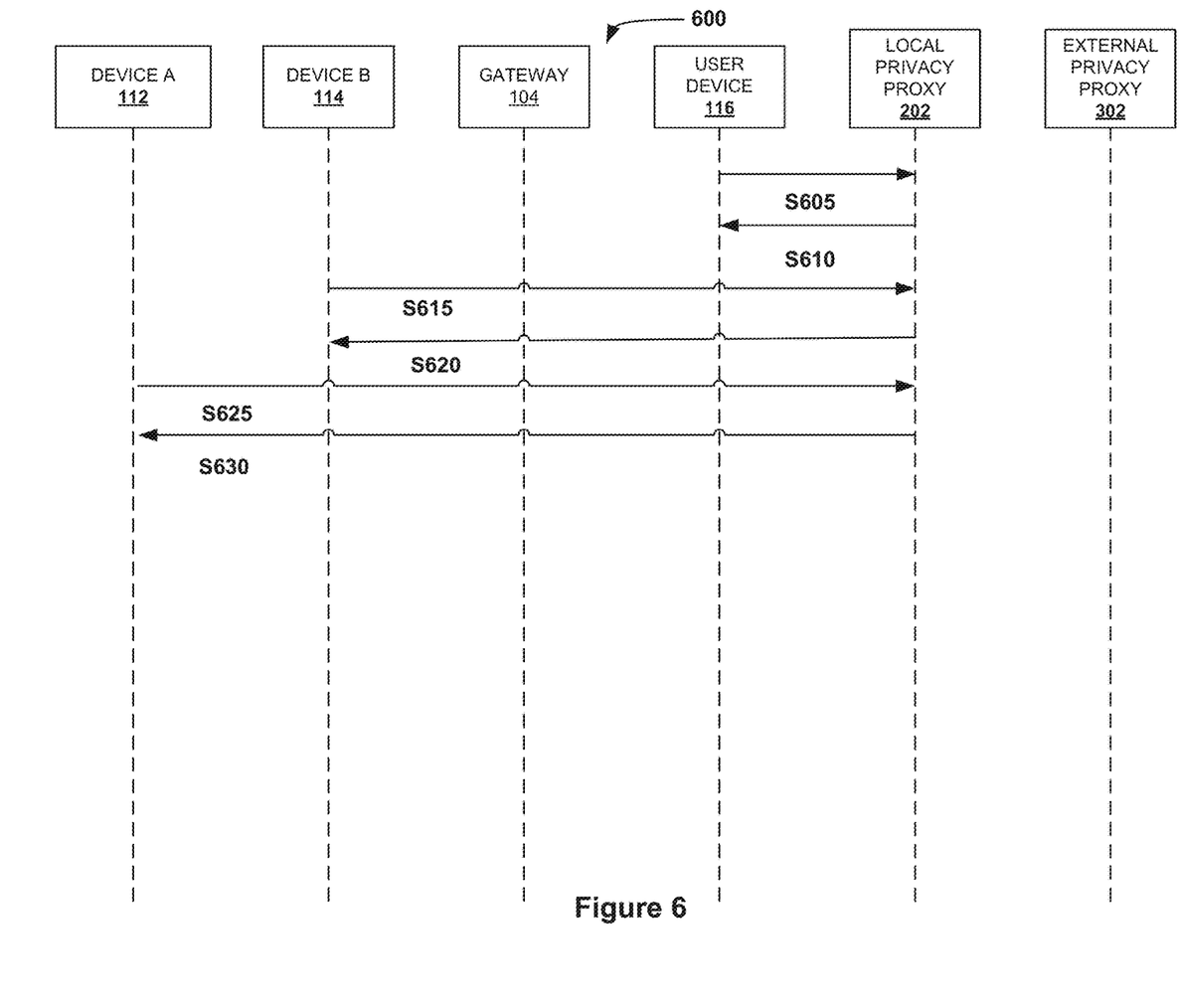
FIG. 6 illustrates a timing diagram of a process for controlling privacy conditions on the second computer network shown in FIG. 2.

FIG. 6 illustrates a timing diagram of a process 600 for controlling privacy conditions on second computer network 200 (shown in FIG. 2). In process 600, similar to process 500, FIG. 5, device A 112 is capable of recording audio, and device B 114 is capable of recording audio and video, and local privacy proxy 202 stores the current privacy settings for local network 102 (shown in FIG. 2) of second computer network 200.

Process 600 begins at step S605, in which user device 116 transmits a request for an update to the current privacy settings. In an exemplary embodiment of step S605, the user device 116 requests that all audio recording stops. In step S610, local privacy proxy 202 confirms the update to the current privacy settings to the user device 116.

In step S615, device B 114 transmits a request to record audio and video to local privacy proxy 202, and local privacy proxy 202 reviews the current privacy setting and determines that recording of audio is not allowed. In step S620, local privacy proxy 202 transmits a response to device B 114. Since, in this example, audio recording is not allowed, the response transmitted in step S620 indicates that device B 114 may begin recording video, but not audio, and device B 114 may (i) begin recording video, or (ii) not record anything until audio recording is available. In the case where device B 114 elects to record only video, then device B 114 will transmit recording status messages to local privacy proxy 202, such as those shown in step S530, FIG. 5. In an exemplary embodiment of step S620, device B 114 continues to transmit those messages for as long as device B 114 is recording video.

In step S625, device A 112 transmits a request to record audio to local privacy proxy 202, and local privacy proxy 202 reviews the current privacy setting determining that recording of audio is not allowed. In step S630, local privacy proxy 202 transmits a negative response to device A 112, namely, that audio recording is not allowed, and device A 112 accordingly will not begin recording audio.

Figure 7:
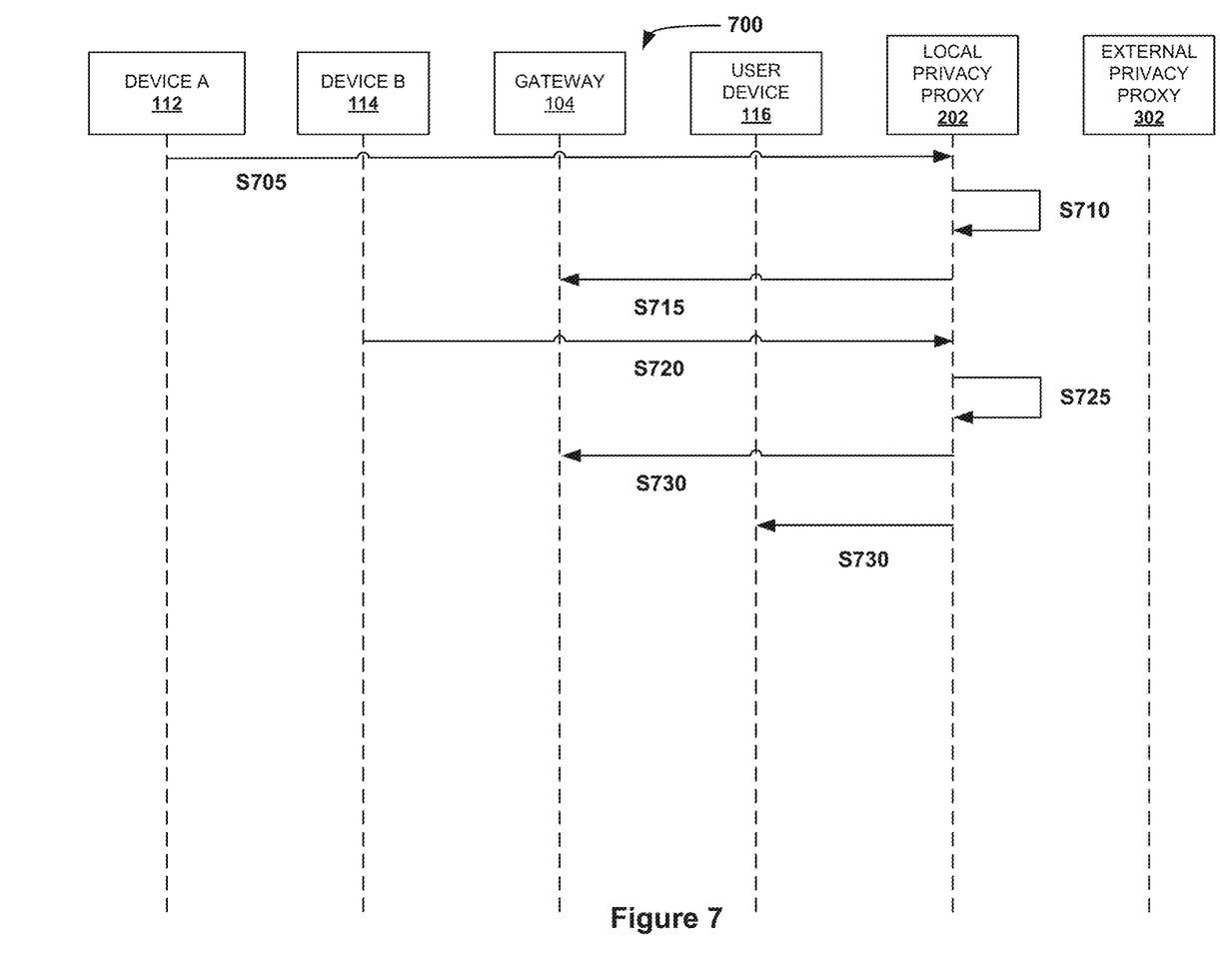
FIG. 7 illustrates a timing diagram of a process for controlling privacy conditions on the third computer network shown in FIG. 3.

FIG. 7 illustrates a timing diagram of a process 700 for controlling privacy conditions on the third computer network 300 (shown in FIG. 3). Similar to the embodiments described above, in this illustrative example of process 700, device A 112 is capable of recording audio, device B 114 is capable of recording audio and video, and local privacy proxy 202 stores the current privacy settings for local network 102 (shown in FIG. 3) of the third computer network 300.

In an exemplary embodiment, process 700 begins at step S705, in which device A 112 transmits messages, which are intended for routing to outside network 106 (shown in FIG. 3), through gateway 104 to local privacy proxy 202. In an exemplary embodiment of step S705, the messages are routed to local privacy proxy 202 before being transmitted outside of local network 102. In step S710, local privacy proxy 202 analyzes the messages before allowing the messages to be transmitted. In an exemplary embodiment of step S710, local privacy proxy 202 scans the messages to determine if any personally identifiable information (PII) is being transmitted by device A 112. Such PII may include, but is not limited to, payment card numbers, social security numbers, weight information, date of birth information, and/or any other information that local privacy proxy 202 is configured to scan for. Local privacy proxy 202 may, for example, be further programmed to remove payloads from the messages and determine what is contained in the messages, where the messages are coming from, and where the messages are being routed to.

In some embodiments, local privacy proxy 202 is programmed to detect when a device starts transmitting information to new or unknown locations. Local privacy proxy 202 may additionally or alternatively be programmed to analyze traffic from device A 112 over time to determine appropriate message traffic patterns for device A 112. Such patterns may enable the detection of when device A is recording or not recording based on the message traffic. In some embodiments, local privacy proxy 202 may detect that device A 112 is recording audio even in the case where audio recording is set to "off" in the privacy security settings. In such instances, local privacy proxy 202 may remove the recording information from the message, such as by writing that section of the payload over with zeros. Alternatively, local privacy proxy 202 may drop the messages with recording information rather than transmitting the messages to gateway 104.

In further operation of step S710, local privacy proxy 202 is configured to edit the messages provided by device A 112 before allowing those messages to be transmitted to outside network 106. For example, in the case where local privacy proxy 202 detects PII in one or more messages from device A 112, then local privacy proxy 202 may remove the PII from the payload of those messages. In some instances, local privacy proxy 202 may rewrite a detected payment card number as all zeros. In an embodiment of step S710, local privacy proxy 202 stores multiple pieces of PII for the user and compares those pieces of data to the messages. Local privacy proxy 202, for example, may be configured to detect such patterns as a 16 digit code for payment cards (e.g., four numbers that are the leading four numbers to indicate a payment card), or a birthday or other important date by detecting three sets of two digits separated by a '/' symbol.

In step S715, local privacy proxy 202 transmits to gateway 104, the message from device A 112 intended outside network 106. In an exemplary embodiment of step S715, the message transmitted to gateway 104 may be a modified version of the message transmitted to local privacy proxy 202.

In step S720, device B 114 transmits, through gateway 104, messages to be routed to outside network 106. In an exemplary embodiment of step S720, the messages are routed to local privacy proxy 202 before being transmitted outside of local network 102. In step S725, local privacy proxy 202 analyzes the messages before allowing the messages to be transmitted. In an exemplary embodiment of step S720, similar to step S725, local privacy proxy 202 scans the messages to determine if (i) any PII is being transmitted by device B 114, and/or (ii) the device B 114 is recording when recording is set to "off" in the privacy security settings.

In step S730, local privacy proxy 202 transmits, to gateway 104, the message from device B 114 intended for outside network 106. In an exemplary embodiment of step S730, the message transmitted to gateway 104 may be a modified version of the message transmitted to local privacy proxy 202. In further embodiments of step S730, local privacy proxy 202 reports, to the user device 116, issues that were detected when scanning the messages from devices A 112 and B 114. For example, local privacy proxy 202 may report that (i) a device is recording even though that device was instructed to stop recording, (ii) messages are being routed to unknown destinations, and/or (iii) messages from one or more of devices A 112 and B 114 contain PII.

Figure 8:
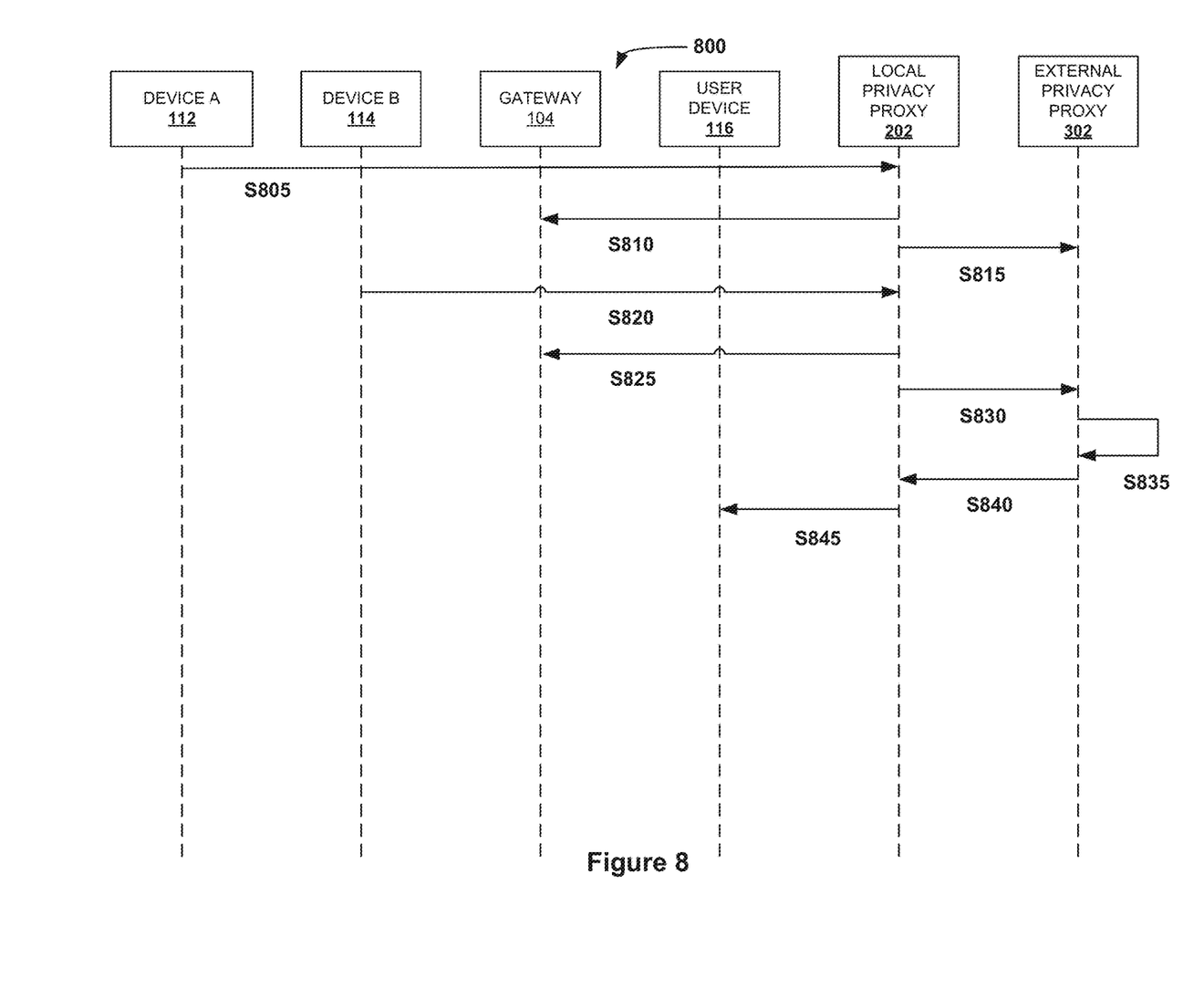
FIG. 8 illustrates a timing diagram of a process for controlling privacy conditions on the third computer network shown in FIG. 3.

FIG. 8 illustrates a timing diagram of a process 800 for controlling privacy conditions on the third computer network 300 (shown in FIG. 3). Similar to the embodiments described above, in process 800, device A 112 is depicted as being capable of recording audio, device B 114 capable of recording audio and video, and local privacy proxy 202 stores the current privacy settings for local network 102 (shown in FIG. 3) of the third computer network 300.

In an exemplary embodiment, process 800 begins at step S805, in which device A 112 transmits, through gateway 104, messages to be routed to outside network 106 (shown in FIG. 3). In an exemplary embodiment of step S805, the messages are routed to local privacy proxy 202 before being transmitted outside of local network 102. In step S810, local privacy proxy 202 transmits, to gateway 104, the message from device A intended for transmission to outside network 106. In step S815, local privacy proxy 202 further transmits the message to an external privacy proxy 302.

In step S820, device B 114 transmits, to local privacy proxy 202 through gateway 104, messages intended for routing to outside network 106. In an exemplary embodiment of step S820, the messages are routed to local privacy proxy 202 before being transmitted outside of local network 102. In step S825, local privacy proxy 202 transmits the message from device B 114 to gateway 104, for subsequent transmission to outside network 106. In step S830, local privacy proxy 202 also transmits the message to external privacy proxy 302.

In step S835, external privacy proxy 302 analyzes the messages from device A 112 and device B 114. External privacy proxy 302 scans the messages to determine if (i) any PII is being transmitted by one of devices A 112 and B 114, (and/or (ii) devices A 112 and B 114 are recording when recordings have been turned off in the current privacy settings. In an exemplary embodiment of step S835, external privacy proxy 302 performs analysis of the messages similar to that of local privacy proxy 202 described above in process 700.

Figure 9:
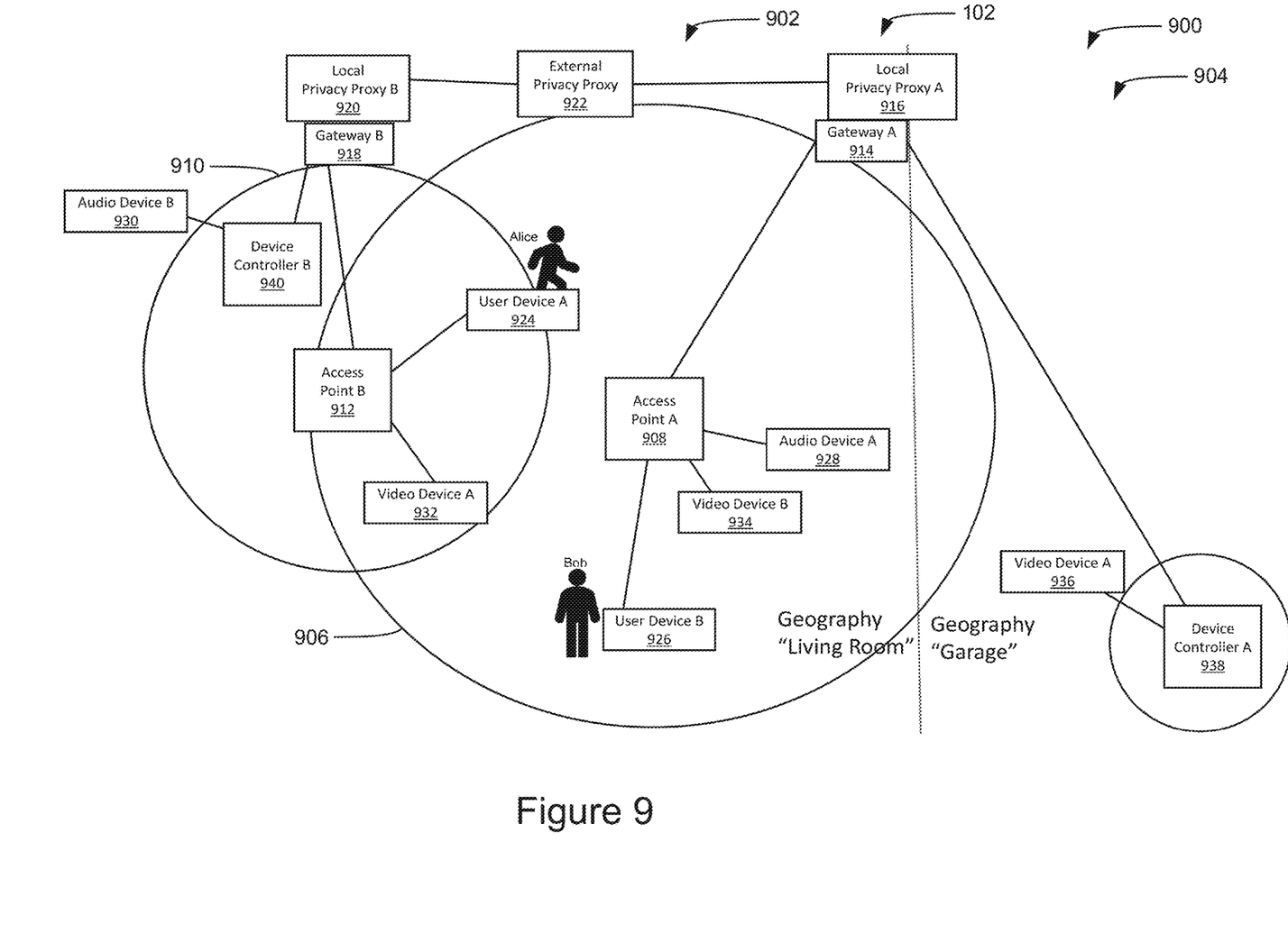
FIG. 9 illustrates a block diagram of a home environment using the privacy protection shown in FIG. 3.

FIG. 9 illustrates a block diagram of a home networking environment 900 using the privacy protection techniques described above with respect to FIG. 3. In an exemplary embodiment depicted in FIG. 9, home networking environment 900 is divided, by way of example and not in a limiting sense, into two zones: (1) living room zone 902; and (2) garage zone 904. While only two zones are shown in this example, the person of ordinary skill in the art will understand, after reading and comprehending the present specification, that home networking environment 900 may have a plurality of alternative or additional different zones of the home network. In this example, zones 902, 904 enable home networking environment 900 to have different privacy settings for different devices in each zone. In the alternative example of an office environment, there may be one zone for public use (e.g., a lobby area), and another zone intended only for use by employees, and/or still further secure zones having stricter privacy settings.

In the exemplary embodiment depicted in FIG. 9, local network 102 includes living room zone 902 and garage zone 904. Living room zone 902 includes a first area of coverage A 906 for a first access point A 908, and second area of coverage B 910 for a second access point B 912. In an embodiment, first access point A 908 is in operable communication with a first gateway A 914, which may be similar to gateway 104 (shown in FIG. 1), and with a first local privacy proxy A 916, which may be similar to local privacy proxy 202 (shown in FIG. 2). In some embodiments, first local privacy proxy A 916 is an integral portion of first gateway A 914. In other embodiments, first local privacy proxy A 916 is separate and/or remote from first gateway A 914.

In this exemplary embodiment, second access point B 912 is similarly depicted to be in operable communication with a second gateway B 918, which may also be similar in structure and functionality to gateway 104, and with a second local privacy proxy B 920, which may be similar to local privacy proxy 202. In this embodiment, first local privacy proxy A 916 and second local privacy proxy B 920 are both in communication with external privacy proxy 922, which may be similar to external privacy proxy 302 (shown in FIG. 3).

In an embodiment, a user device A 924, a user device B 926, an audio device A 928, an audio device B 930, a video device A 932, a video device B 934, and a video device C 936 are connected with local network 102. User devices A 924 and B 926 may be similar to user device 116, FIG. 1, and audio devices A 928 and B 930 and video devices A, 932, B 934, and C 936 may be similar to devices A 112 and B 114, also FIG. 1. Some of these devices, such as audio device A 928 and video device A 932 in the embodiment depicted in FIG. 9, are directly connected to first and second access points A 908 and B 912. Other devices in this embodiment, such as video device C 936 and audio device B 930, are depicted as being connected to local network 102 through a device controller A 938 and a device controller B 940, respectively.

The home networking environment 900 illustrates an exemplary advanced privacy system that may be advantageously implemented for a plurality of different devices having a variety of different respective levels of compliance with the privacy settings of local network 102. For example, audio device A 928 may be non-compliant with the privacy settings of local network 102 (e.g., legacy equipment not equipped for handling privacy settings). In exemplary operation of this example, audio device A 928 transmits, to first gateway A 914, recorded audio data to an intended destination in an outside network 106, FIG. 1. First local privacy proxy 916 monitors the message traffic from audio device A 928 and determines when is audio device A 928 recording. When audio device A 928 is recording, and in the case where the privacy settings have been set to no audio recording, then local privacy proxy 916 advantageously stops the messages containing recorded audio before transmission to outside network 106. In some embodiments, the stopped messages are rewritten to remove the audio information, and then forwarded in rewritten form. In other embodiments, the messages are dropped by local privacy proxy 916.

Further to this example, audio device B 930 represents a device that is compliant with the privacy settings of local network 102. Compliant audio device B 930 may thus be enabled to transmit messages, including metadata in the respective IP headers (e.g., outside of any encrypted data payload), indicating the current recording status of the device. In some embodiments, the header information may include, without limitation, an originating device identifier, a recording type(s), how the recorded data will be used, and a destination of the recorded data. For example, audio device B 930 may send headers {audio device B 930, audio, device use, local} in the case where audio device B 930 is used to receive verbal commands from a user. In another example, video device A 932 may send headers {video device A 932, video and behavioral, academic research, remote} in the case where a household user within local network 102 is using video device A 932 to capture videos of a person's dog walking habits.

In some further embodiments, the IP headers may also include location or geographic information, including, for example, which zone 902, 904 video device B 934 is disposed within (e.g., {video device B 934, video and behavioral, security, remote, living room zone 902}). Similarly, video device C 936 may transmit headers such as {video device C 936, video and behavioral, security, remote, garage zone 904}.

In an exemplary embodiment, local privacy proxies A 916 and B 920 may include different privacy settings for different zones, different recording types, different recording destinations, and different uses, and a particular user may be enabled to update each of these privacy settings using a respective user device A 924 and/or B 926. In some embodiments, a user may subscribe to receive current recording statuses for different recording types, different destinations, and/or different uses. For example, a user of user device A 924, "Alice", may arrive in local network 102. User device A 924 may then look at local network 102 to determine if any respective devices thereof are recording audio. In some instances, user device A 924 may be further enabled to publish a message to first local privacy proxy A 916 to request (i) that all audio be stopped, or (ii) that all recording stop that is not related to security.

In this example, when Alice and user device A 924 leave local network 102, local privacy proxies A 916 and B 920 may update to subsequently allow audio recording, that is, in the case where audio recording was allowed prior to Alice's arrival within first coverage area A 906. Additionally, in the case where Alice and user device A 924 have moved to being connected to first access point A 908, that is, away from second coverage area B 910 and connection to second access point B 912, second local privacy proxy B 920 may similarly update to allow audio recording (i.e., where audio recording was allowed prior to Alice operating within second coverage area B 910). In this case, first local privacy proxy A 916 may receive the request to stop audio recording from user device A 924.

In some embodiments, different privacy settings may override requests from users. For example, a series of security cameras are set to be always recording. Security cameras may continue to record, that is, even if a user requests, via a user device A 924 or B 926, to stop all recording. These overriding privacy settings may be set by an administrator. Additionally or alternatively, Bob and user device B 926, for example, may be permitted to override the request from Alice and user device A 924.

In some embodiments, device controllers A 938 and B 940 may be used to handle legacy recording devices, where the device controllers A 938 and B 940 control the recording of the connected devices and add the IP header information to the messages from those connected devices.

While the above systems and methods describe different types of recording (audio, video, data, behavioral, etc.), in some embodiments, the privacy settings include settings for turning all recording on and off at once. In these embodiments, there is a global privacy setting that indicates whether or not any recording is allowed on local network 102. If this global setting is set to no recording, then that would overrule any other privacy setting that would allow recording. If the global setting is set to allow recording, then the privacy setting for each type of recording would then be used.

In an exemplary embodiment, external privacy proxy 302 performs its analysis subsequent to the messages being transmitted to outside network 106. Accordingly, external privacy proxy 302 reports issues after the issue has occurred. In step S840, external privacy proxy 302 reports the results of its analysis to local privacy proxy 202. In some embodiments, step S840 occurs whenever an issue is discovered. In other embodiments, step S840 occurs on a periodic basis, such as every ten minutes or every hour. In step S845, local privacy proxy 202 transmits at least a portion of the report from external privacy proxy 302 to the user device 116.

The computer-implemented methods and processes described herein may include additional, fewer, or alternate actions, including those discussed elsewhere herein. The present systems and methods may be implemented using one or more local or remote processors, transceivers, and/or sensors (such as processors, transceivers, and/or sensors mounted on vehicles, stations, nodes, or mobile devices, or associated with smart infrastructures and/or remote servers), and/or through implementation of computer-executable instructions stored on non-transitory computer-readable media or medium. Unless described herein to the contrary, the various steps of the several processes may be performed in a different order, or simultaneously in some instances.

Additionally, the computer systems discussed herein may include additional, fewer, or alternative elements and respective functionalities, including those discussed elsewhere herein, which themselves may include or be implemented according to computer-executable instructions stored on non-transitory computer-readable media or medium.

In the exemplary embodiment, a processing element may be instructed to execute one or more of the processes and subprocesses described above by providing the processing element with computer-executable instructions to perform such steps/sub-steps, and store collected data (e.g., time variant parameters, digital signatures, certificates, etc.) in a memory or storage associated therewith. This stored information may be used by the respective processing elements to make the determinations necessary to perform other relevant processing steps, as described above.

The aspects described herein may be implemented as part of one or more computer components, such as a client device, system, and/or components thereof, for example. Furthermore, one or more of the aspects described herein may be implemented as part of a computer network architecture and/or a cognitive computing architecture that facilitates communications between various other devices and/or components. Thus, the aspects described herein address and solve issues of a technical nature that are necessarily rooted in computer technology.

Furthermore, the embodiments described herein improve upon existing technologies, and improve the functionality of computers, by more reliably protecting the integrity of broadcast messages and timestamps at the server-side, and by further enabling the easier and more efficient verification of a received broadcast message at the client-side. The present embodiments therefore improve the speed, efficiency, and reliability in which such determinations and processor analyses may be performed. Due to these improvements, the aspects described herein address computer-related issues that significantly improve the security of broadcasting messages in comparison with conventional techniques. Thus, the aspects herein may be seen to also address computer-related issues such as communication security between electronic computing devices or systems, for example.

Exemplary embodiments of systems and methods for broadcast messaging protection are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A privacy proxy device for maintaining privacy on a communication network, comprising:
    a transceiver configured for operable communication with at least one user device and at least one device capable of recording over a communication medium of the communication network, wherein the communication network includes at least a first zone and a second zone, wherein the first zone includes a first set of one or more devices, wherein the second zone includes a second set of one or more devices;
    a processor including a memory configured to store computer-executable instructions, which, when executed by the processor, cause the privacy proxy device to:
        store a plurality of privacy settings for each of the first zone and the second zone of the communication network including one or more recording settings;
        receive a request to record from a recording device not currently recording of the at least one device capable of recording in the first zone;
        compare the request to record to the plurality of privacy settings for the first zone; and
        generate and transmit a response to the request to record based on the comparison.

2. The privacy proxy device of claim 1, wherein the one or more recording settings include a recording type including at least one of audio, video, and personal data.

3. The privacy proxy device of claim 2, wherein the personal data recording type includes personally identifiable information, access data, and website data.

4. The privacy proxy device of claim 1, wherein the recording device is an Internet of Things device.

5. The privacy proxy device of claim 1, wherein the instructions further cause the privacy proxy device to receive a recording status message from a recording device indicating that the recording device is currently recording.

6. The privacy proxy device of claim 1, wherein the instructions further cause the privacy proxy device to:
    receive a current recording status request from a user device in the first zone;
    determine a current recording status for the first zone based on which recording devices are currently recording and the corresponding recording type; and
    transmit the current recording status for the first zone to the user device.

7. The privacy proxy device of claim 1, wherein the instructions further cause the privacy proxy device to:
    receive a stop recording message from a user device in the first zone; and
    update the one or more recording settings for the first zone.

8. The privacy proxy device of claim 7, wherein the stop recording message is associated with a first recording type, and wherein the instructions further cause the privacy proxy device to:
    determine which recording devices in the first zone are currently recording the first recording type; and
    transmit a stop recording message to the determined recording devices.

9. The privacy proxy device of claim 8, wherein the instructions further cause the privacy proxy device to:
    receive a resume recording message from the user device in the first zone; and
    transmit a begin recording message to the determined recording devices.

10. The privacy proxy device of claim 7, wherein the stop recording message is in response to the user device receiving or placing a phone call.

11. The privacy proxy device of claim 1, wherein the instructions further cause the privacy proxy device to:
    detect which zone that a first user device is currently in, wherein the first user device has a "recordings not allowed" privacy setting;
    instruct the first set of one or more devices to stop recording when the first user device is in the first zone; and
    instruct the second set of one or more devices to stop recording when the first user device is in the second zone.

12. A computer-implemented method for maintaining privacy on a communication network, the method implemented by a computer device comprising a transceiver and a processor including a memory configured to store computer-executable instructions, wherein the transceiver is configured for operable communication with at least one user device and at least one device capable of recording over a communication medium of the communication network, wherein the communication network includes at least a first zone and a second zone, wherein the first zone includes a first set of one or more devices, wherein the second zone includes a second set of one or more devices; wherein the method comprises
    storing a plurality of privacy settings for each of the first zone and the second zone of the communication network including one or more recording settings;
    receiving a request to record from a recording device not currently recording of the at least one device capable of recording in the first zone;
    comparing the request to record to the plurality of privacy settings for the first zone; and
    generating and transmitting a response to the request to record based on the comparison.

13. The computer-implemented method of claim 12, wherein the one or more recording settings include a recording type including at least one of audio, video, and personal data.

14. The computer-implemented method of claim 13, wherein the personal data recording type includes personally identifiable information, access data, and website data.

15. The computer-implemented method of claim 12, wherein the recording device is an Internet of Things device.

16. The computer-implemented method of claim 12 further comprising receiving a recording status message from a recording device indicating that the recording device is currently recording.

17. The computer-implemented method of claim 12 further comprising:
receiving a current recording status request from a user device in the first zone;
determining a current recording status for the first zone based on which recording devices are currently recording and the corresponding recording type; and
transmitting the current recording status for the first zone to the user device.

18. The computer-implemented method of claim 12 further comprising:
receiving a stop recording message from a user device in the first zone; and
updating the one or more recording settings for the first zone.

19. The computer-implemented method of claim 18, wherein the stop recording message is associated with a first recording type, and wherein the method further comprises:
determining which recording devices in the first zone are currently recording the first recording type;
transmitting a stop recording message to the determined recording devices;
receiving a resume recording message from the user device in the first zone; and
transmitting a begin recording message to the determined recording devices.

20. The computer-implemented method of claim 18, wherein the stop recording message is in response to the user device receiving or placing a phone call.

* * * * *